(12) United States Patent
Popovich

(10) Patent No.: US 6,771,593 B2
(45) Date of Patent: Aug. 3, 2004

(54) METHOD FOR IMPROVING PACKET DELIVERY IN AN UNRELIABLE ENVIRONMENT

(75) Inventor: George Popovich, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 505 days.

(21) Appl. No.: 09/871,409

(22) Filed: May 31, 2001

(65) Prior Publication Data

US 2002/0186652 A1 Dec. 12, 2002

(51) Int. Cl.⁷ .................................................. H04J 1/16
(52) U.S. Cl. ...................................... 370/218; 370/389
(58) Field of Search ................................ 370/389–395, 370/432, 349, 474; 455/518; 707/3, 104.01; 713/201, 168–170, 200; 709/201, 224

(56) References Cited

U.S. PATENT DOCUMENTS

| | | | |
|---|---|---|---|
| 4,689,785 A | * | 8/1987 | Toyonaga et al. ........... 370/448 |
| 5,473,599 A | | 12/1995 | Li et al. |
| 5,590,118 A | | 12/1996 | Nederlof |
| 5,926,463 A | * | 7/1999 | Ahearn et al. .............. 370/254 |
| 5,963,540 A | | 10/1999 | Bhaskaran |
| 6,101,180 A | | 8/2000 | Donahue et al. |
| 6,154,463 A | * | 11/2000 | Aggarwal et al. .......... 370/408 |
| 6,308,148 B1 | * | 10/2001 | Bruins et al. ................. 703/27 |
| 6,343,345 B1 | * | 1/2002 | Hilla et al. ................. 711/138 |
| 6,487,605 B1 | * | 11/2002 | Leung ........................ 709/245 |
| 6,563,830 B1 | * | 5/2003 | Gershon et al. ....... 370/395.53 |
| 6,594,268 B1 | * | 7/2003 | Aukia et al. ................ 370/400 |
| 6,611,872 B1 | * | 8/2003 | McCanne ................... 709/238 |

* cited by examiner

Primary Examiner—Chi Pham
Assistant Examiner—Prenell P Jones
(74) Attorney, Agent, or Firm—Val Jean F. Hillman; Terri S. Hughes; Indira Saladi

(57) ABSTRACT

A packet delivery method employs redundant path definitions to improve reliability in a packet delivery system.

13 Claims, 5 Drawing Sheets

400

METHOD FOR IMPROVING PACKET DELIVERY IN AN UNRELIABLE ENVIRONMENT

CROSS REFERENCE TO RELATED PATENTS

This application is related to U.S. Pat. No. 6,141,347, granted Oct. 31, 2000, entitled "Wireless Communication System Incorporating Multicast Addressing and Method For Use"; U.S. patent application Ser. No. 09/464,269, filed Dec. 17, 1999, entitled "Methods for Implementing A Talk Group Call In A Multicast IP Network"; and U.S. patent application Ser. No. 09/728,360, filed Dec. 1, 2000, entitled "Wireless Communication System Incorporating Multicast Addressing and Method for Use", all three assigned to the assignee of record in the present application.

FIELD OF THE INVENTION

The present invention relates generally to communication systems and, more particularly to packet-based communication systems. In particular, the present invention relates to a packet-based wireless communication system that incorporates IP addressing.

BACKGROUND OF THE INVENTION

Packet data networks consisting of a plurality of interconnected nodes are well known. A node in such a network may include any device supporting voice, data, and/or video communication. By way of example, and not by way of limitation, nodes may include computers, telephones, modems, fax machines, printers, personal digital assistants (PDA), cellular telephones, office and/or home appliances, and the like. In addition, packet data network nodes may include switches and/or routers that forward information to other nodes in the network. etc. or by wireless links. Examples of such packet data networks include the Internet, Ethernet networks, local area networks (LANs), personal area networks (PANs), wide area networks (WANs), and wired as well as wireless communication systems.

The nodes in a packet data network are typically assigned one or more addresses. These addresses are frequently used for delivering information between the various nodes within the packet data network. For example, when data is transported in a packet data network, the data may be divided into blocks or packets prior to transmission. A header containing the address of the destination node is attached to each packet. The routers or switches in the packet data network use the address to direct each packet to a destination or destinations for reassembly into an original message.

When data is sent to a plurality of destinations in a packet data network employing the Internet protocol or some other packet delivery protocol, routers in the packet network determine a path to each of the destination nodes. This set of destinations is frequently referred to as a group or multicast group. The set of paths to each of the nodes in the destination group are frequently referred to as multicast routing trees. The node from which the paths begin is the root of the tree. Generally, there are two different types of multicast routing trees: source-based trees and shared trees. With a source-based tree, a path between each node that may send data to a multicast group and each node in the multicast group is determined. If the multicast group has many members or there are many nodes that are sending data to the multicast group, a source based tree approach can be very complex and use a lot of network resources since a path must be constructed from each sender to each group member. With a shared tree, a path from a common node to each member of the multicast group is determined. When a node sends data to the multicast group, the packets are sent to the common node that then forwards them to all the members of the group.

Multicast routing protocols can be divided into dense mode protocols and sparse mode protocols. In sparse mode protocols a path is built from the root node (whether a source or a common node) to each of the member nodes of the multicast group. The set of these paths makes up the multicast routing tree. In dense mode protocols, the multicast routing tree is built using a two step process. First, the root node for the multicast group (whether a source node or common node) floods all possible paths with multicast messages. Then the routers receiving the multicast messages inform the other routers in the packet data network whether they are connected to any members of the multicast group. This information is used to stop the flow of future multicast messages to routers that are not in paths to member nodes of the multicast group.

One protocol that can be used for multicast routing is the sparse mode of protocol independent multicasting (PIM-SM). PIM-SM uses shared trees for routing packets to the multicast groups. When a multicast group is formed, one router, called the rendezvous point (RP), is designated. A routing path is built from the RP to every member node of the multicast tree. When data packets are sent to the nodes of the multicast group, the data packets are first sent to the RP. The RP then sends the data packets to each of the multicast group members. There is shown in FIG. 1 an example of a packet data network that uses PIM-SM for multicast routing. The packet data network comprises a plurality of nodes, 102–116 and 130–140, connected by a plurality of wireless links 150–176. Nodes 130–140 can be routers, switches, or similar devices that forward data packets to other nodes. In accordance with one embodiment of the present invention, router 134 is designated as a RP for a multicast group consisting of nodes 106, 108, and 112. The arrows on the links of FIG. 1 show the flow of a data packet from a source node 102 to the member nodes of the multicast group. The source node 102 sends the packet to the RP 134. The RP 134 then sends copies of the data packet to each member of the multicast group 106, 108, 112 following the paths shown.

One disadvantage of multicast protocols that use shared trees, such as, for example, PIM-SM, is the dependency on the RP. If the RP stops functioning, communication to the entire multicast group is lost. To reestablish the communication a new RP must be assigned and a path to all the member nodes built. This can take several seconds. For some types of data such as streaming audio and video or voice conversations, such delays are unacceptable. Hence there is a need for a method to improve the reliability of packet delivery in an unreliable environment, such as, for example, packet data networks in general, and the Internet in particular. This method should allow for the quick recovery of communication when a common node fails, or is otherwise unavailable.

BRIEF DESCRIPTION OF THE DRAWINGS

The foregoing and other advantages of the invention will become apparent upon reading the following detailed description and upon reference to the drawings in which.

DESCRIPTION OF A PREFERRED EMBODIMENT

The present disclosure identifies a method for improving the reliability of packet delivery in a packet-based network. In accordance with one embodiment, the packet-based network employs a multicast protocol such as the multicast IP protocol. In accordance, multicast routing trees are built from a common router called a core router or rendezvous point (RP). When the RP malfunctions, a large amount of time is required to select a new RP and build a new multicast routing tree. In order to decrease the time required to recover from a RP malfunction, a second router is designated as a secondary RP. The secondary RP takes over the multicast routing function if and when the primary RP is not available.

Figure 1:
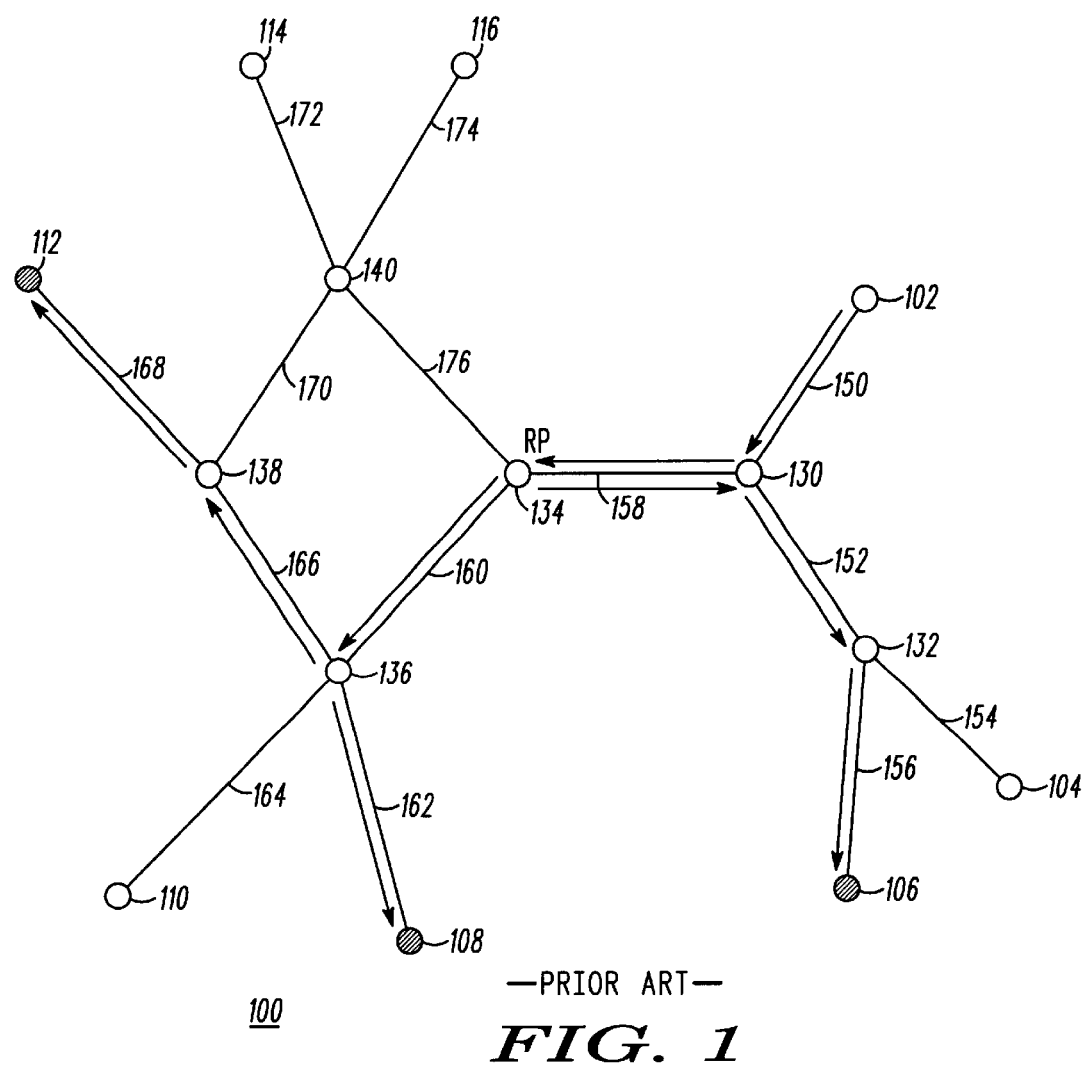
FIG. 1 is a diagram of a packet data network.
Figure 2:
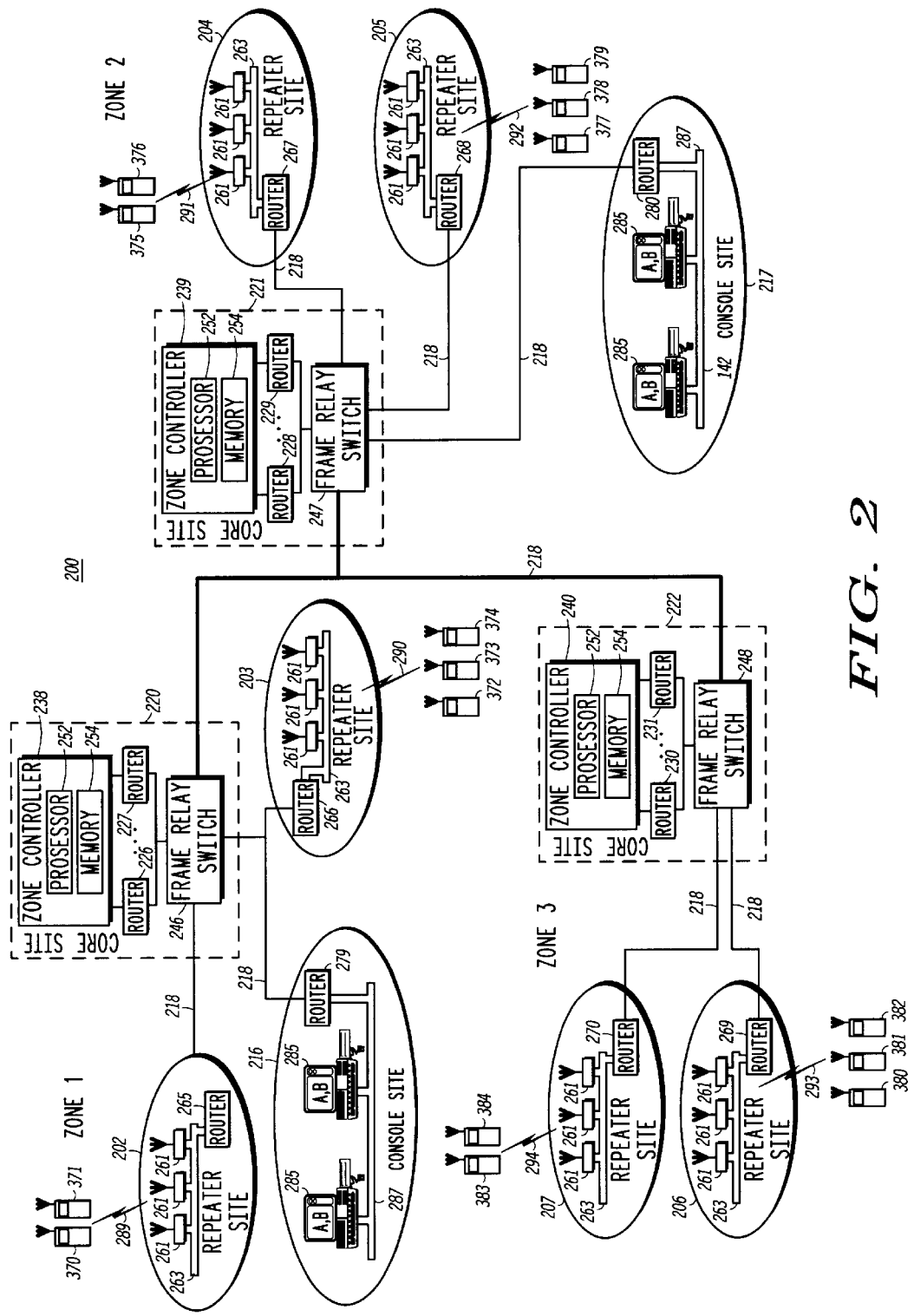
FIG. 2 is a diagram of a wireless communication system that comprises a packet network that supports addressing of packets to provide group or dispatch service according to one embodiment of the present invention.

With reference to FIG. 2, there is shown a wireless communication system 200 in accordance with one embodiment of the present invention. The wireless communication system 200 comprises a packet network that supports Internet Protocol (IP) multicast addressing of packets to provide group or dispatch call service. As will be appreciated by those skilled in the art, multicast packets are, by definition, those packets with IP Destination Addresses whose four most significant bits are "1110"—that is, they have the form 1110.multi-cast-group. In dotted-decimal notation, the range of IP multicast addresses, also know as Internet Class D Addresses, are 224.0.0.1 through 239.255.255.255. The packet network comprises a plurality of repeater sites 202–207, console sites 216–217, and core sites 220–222 which sites operate to provide differing zones of coverage designated Zones 1–3. Each zone of coverage contains one core site 220–222, one or more repeater sites 202–207, and optionally one or more console sites 216–217. The repeater sites 202–207, console sites 215–217, and core sites 220–222 are interconnected by way of a plurality of site links 218. These site links 218 may comprise for example, T1 lines, E1 lines, fiber optic lines, wireless links, or other suitable means for transporting data between such sites.

The core sites 220–222 comprise at least two routers 226–231, a zone controller 238–240, and a frame relay switch 246–248. The routers 226–231 may comprise, for example, 3Com "NetBuilder" series routers or the series 2600, 3640, 7200, and 7500 routers, which have in the past been available from Cisco. Each router 226–231 is coupled to a zone controller 238–240 having a processor 252 (such as, for example a microprocessor, micro-controller, digital signal processor or some combination thereof) and a memory 254 (such as volatile or non-volatile digital storage devices or some combination thereof). In one embodiment of the present invention, the zone controllers 238–240 manage and assign IP multicast addresses for payload (voice, data, video, etc.) and control messages between and among the various sites 202–217. Several methods that the zone controllers may employ to manage and assign IP multicast addresses are described in U.S. patent application Ser. No. 09/728360 titled "Wireless Communication System Incorporating Multicast Addressing and Method for Use" which is assigned to the assignee of the present invention. The frame relay switches 246–248 use the frame relay protocol to transport data between the routers 226–231 at the core sites 220–222, the repeater and console sites 202–217, and the other core sites 220–222. As is well known, frame relay can be used to transport IP packets using private virtual circuits (PVC) between routers. For example, the link between the frame relay switch 246 and a router 266 at repeater site 203 may contain PVC from both the routers 226, 227 in the Zone 1 core site 220. To the routers 226, 227, 266 the shared link between the switch 246 and router 266 appear to be two separate physical links.

As shown in FIG. 2, each repeater site 102 includes a plurality of repeaters 261 that are coupled via a local area network (LAN) 263 such as, for example, Ethernet, Token Ring, or any other commercial or proprietary LAN technology, to a router 265–270. As will be appreciated, the repeaters at the various repeater sites 202–207 communicate, via wireless communication resources 289–294 with a plurality of subscriber units 370–384, which may comprise mobile or portable wireless communication units. As will be appreciated, the wireless communication resources 289–294 may comprise any of the currently available resources, such as, for example, radio frequency (RF) technologies, including, but not limited to Code Division Multiple Access (CDMA), Time Division Multiple Access (TDMA), Frequency Division Multiple Access (FDMA), and the like. Moreover, the invention of the present application may be used in any of the currently available Radio Frequency (RF) communication systems, such as, for example, Global System for Mobile communication (GSM), General Packet Radio Service (GPRS), Universal Mobile Telecommunications Service (UMTS), Trans-European Trunked Radio service (TETRA), Association of Public Safety Communication Officers (APCO) Project 25, Personal Communication Service (PCS), Advanced Mobile Phone Service (AMPS) and the like. In the alternative, other wireless technologies, such as those now known or later to be developed and including, but not limited to, infrared, Bluetooth, electric field, electromagnetic, or electrostatic transmissions, will offer suitable substitutes.

In accordance with the present invention, preferable wireless resources 289–294 comprise multiple RF channels such as pairs of frequency carriers, TDMA time slots, CDMA channels, and the like. In the case where the communication resources comprise RF channels, it is common to assign separate channels for different types of communication traffic. Thus, repeaters at the various sites 202–207 may comprise control channel repeaters, voice channel repeaters and/or link repeaters.

In contrast, console sites 216–217 include a plurality of dispatch consoles 285 that are coupled via LAN 287 to a router 279–280. Although not shown in FIG. 2, it will be appreciated that a single site may include a combined repeater/console site. It will be further appreciated that the console sites 216–217 or repeater sites 202–207 may be co-located with the core sites 220–222 and that the core site equipment (i.e. routers, zone controllers, and frame relay switches) for multiple zones may be co-located at a single site.

Practitioners skilled in the art will appreciate that the communication system 200 may include various other communication devices not specifically shown in FIG. 2. For example, the communication system 200 may contain a link such as, for example a T1 line or E1 digital carrier system that connects the routers 226–231 to a public switched telephone network (PSTN) via a telephone gateway, a paging network or short message system via a paging gateway, and a facsimile machine or similar device via a fax gateway or modem. In addition, the communication system 200 may be connected via a gateway to a number of additional content sources, such as the Internet or various Intranets. In support thereof, the communication system 200 may include any number or type of wire line communication device(s), site controller(s), comparator(s), telephone interconnect device(s), internet protocol telephony device(s), call logger (s), scanner(s) and gateways, collectively referred to herein as a fixed communication device(s) or simply fixed devices. Generally, such fixed communication devices may be either sources or recipients of payload and/or control messages routed through the communication system 200.

As will be further appreciated by those skilled in the art, many variations of the communication system 200 of FIG. 2 are possible. A plurality of zones may be present in the communication system 200. Each zone may contain a different number of repeater sites or console sites. The functions of the zone controller may be split among several devices or zone controllers for multiple zones may be combined in a single device. More than two routers may be present at each core site. The zone controllers and routers may be connected using LAN technology such as, for example, Ethernet, Token Ring, or other commercially available LAN technology rather than using a direct connection. Multiple LANs may be used for connection between the zone controller and routers or multiple zone controllers may be present in a zone to increase the system reliability. The frame relay switch may be replaced by some other technology such as for example, Asynchronous Transfer Mode (ATM), FDDI, or IP routers. As will be appreciated many other variations of the communication system 200 are possible without departing from the spirit and scope of the present invention.

When a call is made in the communication system 200, the devices that participate in the call are called a talk group. Generally, the talk group can comprise any number of devices. These devices can include communication units 370–384 and dispatch consoles 285 as well as devices connected to the communication system 200 through gateways such as for example, computers on the Internet or telephones on the PSTN. Generally, a call can be any kind of voice or data communication between devices. By way of example, and not by way of limitation, a call may be a voice communication between two devices, a voice communication from one device to many devices, a data transfer from one device to another, a data transfer from one device to many devices, a video transfer from one device to another device, or a video transfer from one device to many devices.

Figure 3:
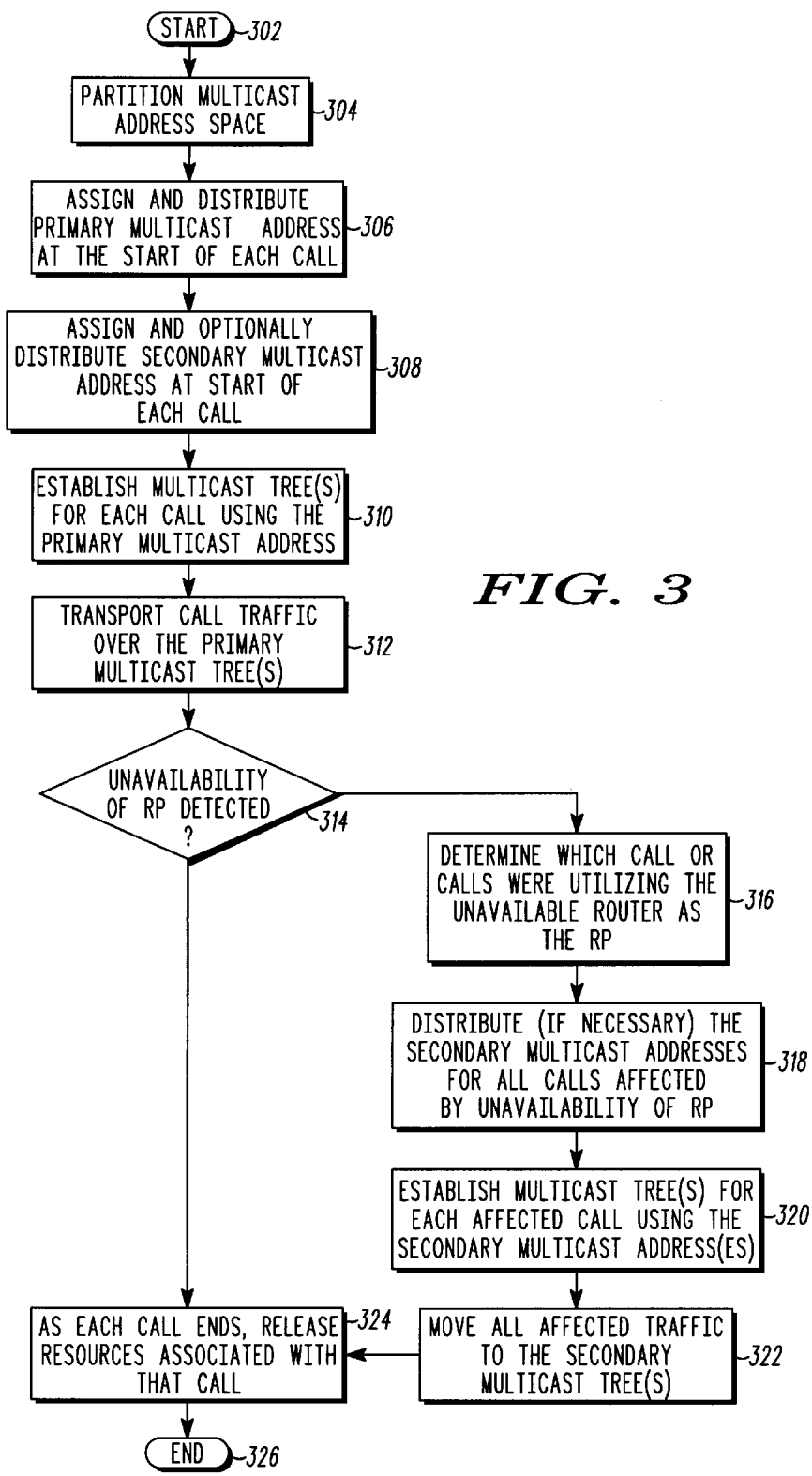
FIG. 3 is a flow chart diagram of a process that provides increased reliability during packet delivery in accordance with one embodiment of the present invention.

With reference to FIG. 3, a flow chart diagram shows a process by which a call is established in the communication system 200. In such a process, two routers are assigned as Rendezvous Points (RP) for the call. One of the routers is a primary RP from which a primary multicast routing tree is built for distribution of the data packets associated with the call. The other router is a secondary RP from which a multicast routing tree is built for distributing data packets associated with the call if the primary RP becomes unavailable due to equipment malfunction or other reason. Once the primary multicast routing tree has been established, data packets destined for the member devices of the talk group are sent to the primary RP. The primary RP then forwards the data packets to all the members of the talk group using the multicast routing tree. When the availability of the primary RP is interrupted, a secondary multicast tree is established and all members of the talk group are notified to send data packets to the secondary RP. The secondary RP then forwards the data packets to the members of the talk group using the secondary multicast tree.

Commencing at start block 302, the flow proceeds to step 304 where the multicast address space is partitioned. Each of the routers that can serve as a RP is assigned a range of multicast addresses. By way of example, the information may be stored at each routing device 226–231, 265–270, 279, 280 and/or in a memory storage device 254 within the zone controller 238–240 of each Zone. By way of further example and not by way of limitation, Zones 1–3 may exhibit the following multicast IP address assignments (hereinafter referred to as a "map of partitioned addresses to Rendezvous Points" or simply the "map"):

MAP I

| | |
|---|---|
| Zone 1, Router 226: | 224.0.1.1 through 225.64.120.78 |
| Zone 1, Router 227: | 225.164.120.79 through 225.134.120.78 |
| Zone 2, Router 228: | 225.200.0.1 through 226.71.23.65 |
| Zone 2, Router 229: | 226.71.23.65 through 228.71.23.65 |
| Zone 3, Router 230: | 228.200.0.1 through 231.202.98.14 |
| Zone 3, Router 231: | 232.200.0.1 through 239.249.145.21. |

In an alternate embodiment of the present invention, the range of multicast addresses assigned to each router that functions as an RP may be further partitioned into a primary and a secondary range. By way of example and not by way of limitation, Zones 1–3 may exhibit the following multicast IP address assignment map:

MAP II

| | |
|---|---|
| Zone 1, Router 226, Primary Range: | 224.0.1.1 through 224.128.120.31 |
| Zone 1, Router 226, Secondary Range: | 224.128.120.32 through 225.64.120.78 |
| Zone 1, Router 227, Primary Range: | 225.64.120.79 through 225.100.120.78 |
| Zone 1, Router 227, Secondary Range: | 225.100.120.79 through 225.134.120.78 |
| Zone 2, Router 228, Primary Range: | 225.200.0.1 through 226.10.23.63 |
| Zone 2, Router 228, Secondary Range: | 226.10.23.64 through 226.71.23.63 |
| Zone 2, Router 229, Primary Range: | 226.71.23.64 through 227.71.23.63 |
| Zone 2, Router 229, Secondary Range: | 227.71.23.64 through 228.71.23.63 |
| Zone 3, Router 230, Primary Range: | 228.200.0.1 through 230.202.98.31 |
| Zone 3, Router 230, Secondary Range: | 230.202.98.32 through 231.202.98.14 |
| Zone 3, Router 231, Primary Range: | 232.200.0.1 through 236.127.145.255 |
| Zone 3, Router 231, Secondary Range: | 236.127.146.0 through 239.249.145.21 |

In still another embodiment of the present invention, routers other than those routers 226–231 at the core sites, such as, for example, repeater site routers 265–270 or console site routers 279–280 may be assigned multicast address ranges. These routers may then serve as RPs for multicast routing. Of note, the primary and secondary multicast addresses can be assigned in a number of different ways. For example, a multicast controller (not shown) may assign the multicast addresses. Alternately, the multicast addresses may be manually assigned.

As will be appreciated, all multicast enabled routers within the communication system 200 will pass the map to each other via well known routing protocols. This operation assures all routers in the communication system 200 receive an identical view of the IP multicast address partitioning and that every router in the system 200 knows the range of addresses supported by each RP.

After step 304, a primary multicast address is assigned to each call at step 306. In one embodiment of the present invention, a zone controller assigns the primary multicast addresses. For each call, one of the zone controllers has responsibility for assigning the multicast address for the call. This zone controller is called a controlling zone controller for the call. The controlling zone controller may be chosen in a number of ways. For example, the controlling zone controller may be the zone controller for the zone that the device originating the call is currently in or it may be the zone controller for the zone with the greatest number of devices receiving the call. The controlling zone controller may also be assigned for a particular talk group so that all calls to the talk group utilize the controlling zone controller. If all devices in the talk group are within the same zone, the zone controller for that zone may be selected as the controlling zone controller.

In accordance with the preferred embodiment, the controlling zone controller decides which router 226–231 should be the primary RP for the call. The primary multicast address is then chosen from the range of multicast addresses partitioned to that router 226–231 in accordance with the map. If the map has separate primary and secondary ranges, such as in the example of Map II, the primary address is chosen from the primary range for the router 226–231 chosen to be the primary RP. Note that under no circumstances is a multicast address assigned to more than one call at the same time. Once the primary multicast address has been assigned, it is distributed to all of the devices (communication units, dispatch consoles, etc.) that are participating in the call.

At step 308, a secondary multicast address is assigned for each call. In one embodiment of the present invention, for each call the controlling zone controller assigns the secondary multicast address for the call. The controlling zone controller selects a router to designate as a secondary RP for the call. Of note, the secondary RP is a different router than the primary RP. The secondary multicast address is then selected from the range of multicast addresses partitioned to the secondary RP. If the map for the secondary RP has separate primary and secondary ranges, such as in the example of Map II, the secondary address is chosen from the secondary range for the router 226–231 chosen to be the secondary RP. As with the primary multicast address, under no circumstances will a multicast address that is currently assigned to another call be assigned as a secondary multicast address. In one embodiment of the present invention, the secondary multicast address is not distributed to the devices participating in the call until after detection of either the failure or the unavailability of the primary RP. In another embodiment, the secondary multicast address is distributed to the devices in the call, prior to any such failure or unavailability detection.

In steps 306 and 308, the controlling zone controller selects a first and a second router as primary and secondary RPs. Several examples of methods for such selection are taught in U.S. patent application Ser. No. 09/728,360. By way of example and not by way of limitation, RP selection can be made as a function of call source or call destination information, call quality, resource availability, destination device geographic density, the probability of service loss at one or more communication zones, the likelihood of unavailability or failure of one or more devices, and the like.

It will be appreciated by those skilled in the art that devices other than the controlling zone controller may select the primary and secondary RPs and assign the multicast addresses. Such alternate devices may include one of the routers, another zone controller, a multicast controller (not shown), or any of the network nodes described herein or as used in or in association with a packet network system of the type described or contemplated herein.

Next, at step 310, a multicast routing tree is established for each call using the primary RP as the root. In accordance with the preferred embodiment, these routing trees are established using any of the available IP multicast protocols, such as, for example, the sparse mode routing protocols such as PIM-SM or Core Based Tree (CBT). The routing trees comprise a path from the primary RP to each device in the calls. The multicast routing trees are then used to transport call traffic at step 312. For each call, data destined for the devices in the call are first sent to the RP. The RP then sends the packets of data to the devices in the call using the multicast tree as is well known in multicast IP routing.

At step 314, a check is made to see if the primary RP is still available. In one embodiment of the present invention, the controlling zone controller periodically sends a message, such as, for example, a "ping" message, to the primary RP. As is well known, a ping message is a request to immediately send a reply back to the sender. If the primary RP does not timely respond to the message, the controlling zone controller may assume that the RP is not available or no longer functioning. The frequency of the ping messages depends on how quickly it is desired to detect a malfunction or the unavailability of the primary RP. In other embodiments of the present invention, devices other than the controlling zone controller may make the ping request of the primary RP. If the unavailability or failure of the primary RP is detected at step 314, the controlling zone controller determines which calls, if any, utilized that router. At step 316, each call utilizing the router in question is thereafter distributed to the respective destination device, utilizing the secondary multicast address. Of note, if the secondary address was previously distributed to the destination devices at step 308, then at step 316, the devices are simply notified to begin utilizing the secondary multicast tree. Otherwise, at step 320, a secondary multicast routing tree is established using the secondary RP as the root. These secondary routing trees are established using any of the IP multicast protocols, such as, for example, the sparse mode routing protocols such as PIM-SM or CBT. For each call, the routing trees comprise a path from the secondary RP to each device in the call. The secondary multicast routing trees with the secondary RP as a root are then used to transport call traffic at step 322. As a call ends, the primary and secondary multicast addresses for the call are released. All record of the primary or secondary multicast routing trees are removed from the routers. The released multicast addresses are then available for assignment to future calls.

As will be appreciated by those skilled in the art, there are numerous variations to the process of FIG. 3 that do not operate to depart from the spirit of the present invention. For example, a device other than a zone controller may assign the primary and secondary multicast addresses; the secondary multicast routing trees may be established at the same time as the primary multicast routing trees; ping messages may be sourced by devices other than the controlling zone controller; and methods other than transmission of ping messages may be used to detect RP availability or failure. For example, a call source device may be used to detect RP availability.

Figure 4:
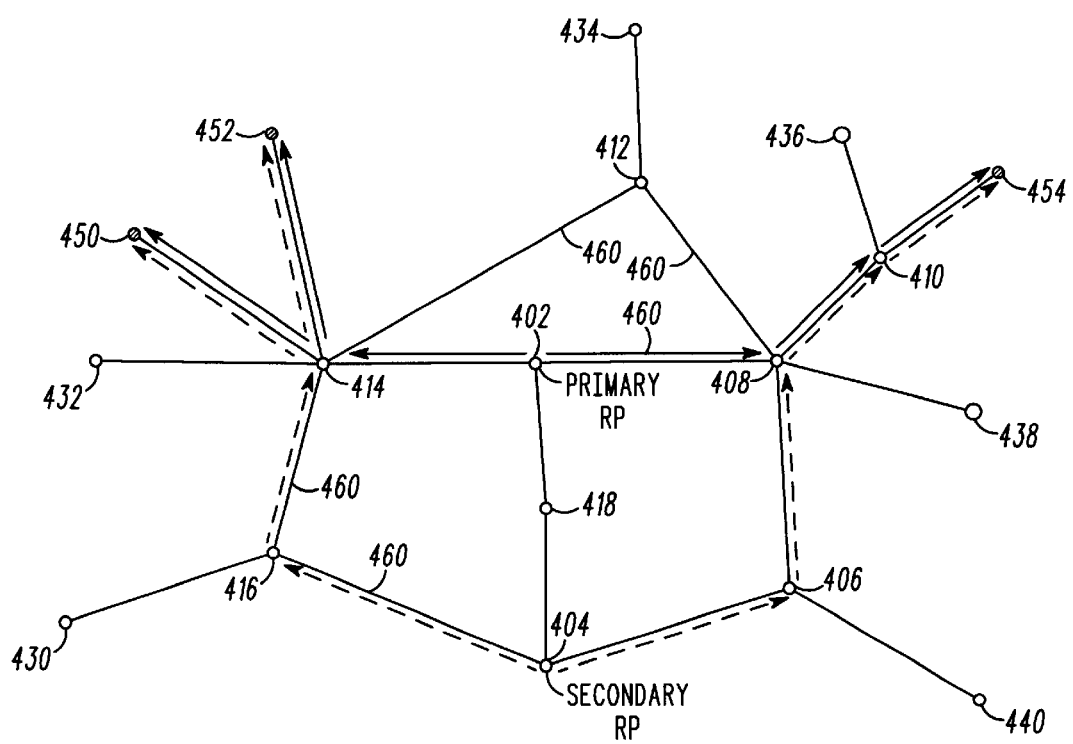
FIG. 4 is a diagram depicting a packet data network.

Turning now to FIG. 4, there is shown a packet data network 400 in accordance with an alternate embodiment of the present invention. The packet data network 400 uses the assignment of a secondary RP to provide quick recovery of multicast routing in the event of the primary RP becoming unavailable, such as, for example, during a failure condition. The packet data network 400 comprises a number of routers 402–418 and edge devices 430–454 interconnected by data links 460. The routers 402–418 may comprise any kind of data network routers such as, for example, 3Com "Net-Builder" series routers or the series 2600, 3640, 7200, and 7500 routers, which have in the past been available from Cisco. The edge devices 430–454 may comprise any devices that require data communication such as, for example, computers, web servers, telephones, etc. The data links 460 may comprise wired or wireless connections such as, for example, Ethernet links, fiber optic links, T1 lines, or radio links.

The edge devices indicated by dark circles 450–454 are members of a multicast group. A shared tree routing protocol is used to distribute data packets to the members of the multicast group. Router 402 is a primary RP for the multicast group 450–454. A primary multicast routing tree, shown by the solid arrow lines of FIG. 4, is built from the primary RP 402 to the members of the multicast group 450–454. Data packets destined for the multicast group 450–454 are sent to the primary RP 402. The primary RP 402 then distributes the data packets using the primary multicast routing tree. Router 404 is a secondary RP for the multicast group 450–454. A secondary multicast routing tree, shown by the dashed line arrows of FIG. 2, is built from the secondary RP 404 to the members of the multicast group 450–454. The secondary multicast routing tree is used to send data packets to the members of the multicast group 450–454 whenever the primary RP 402 malfunctions or otherwise becomes unavailable. The secondary multicast routing tree may be built after the unavailability of the primary RP 402 is detected. Alternately, the secondary multicast routing tree may be built before any malfunction, interruption or unavailability of the primary RP 402 is perceived or otherwise detected. For example, the secondary multicast routing tree may be built at the same time that the primary multicast routing tree is being built. This would allow faster recovery of multicast routing if the primary RP 402 becomes unavailable. Both the primary and secondary multicast routing trees are built using well-known protocols or methods such as PIM-SM, CBT or some other suitable means or methodology. The detection of a malfunction or unavailability of the primary RP 402 can be accomplished by a number of different methods. By way of a first example, and not by way of limitation, the multicast control device (not shown) in the network may periodically send a ping message to the primary RP 402. If the control device does not receive a reply to the ping message, it assumes that the primary RP 402 is unavailable and notifies the edge devices in the multicast group 450–454 to use the secondary multicast address. If the secondary multicast tree has not been built, the multicast control device also notifies the secondary RP 404 to build the secondary multicast routing tree. A second method for detecting unavailability of the primary RP 402 would be for the secondary RP 404 to periodically ping the primary RP 402. The secondary RP 404 would then notify the members of the multicast group 450–454 of the unavailability of the primary RP 402 so that they will start using the secondary multicast address.

Another method of detecting the unavailability of the primary RP 402 would be for the sender of data packets to the multicast group 450–454 to check if the primary RP 402 is functioning. If the sender is a member of the multicast group, the sender should receive the data packets back over the primary multicast tree if the primary RP 402 is still functioning. If the sender is not a member of the multicast group, the sender can simultaneously send a ping request to the primary RP 402 to verify that it is still functioning. In either case, if the sender detects the unavailability of the primary RP 402, it would then notify the secondary RP 404 or a multicast control device, which, in turn would take action to establish the secondary multicast tree for future multicast data packets.

It will be appreciated by those skilled in the art that the present invention may be practiced in data networks other than the communication system 200 of FIG. 2 and the packet data network 400 of FIG. 4. For example, this invention may be employed in networks ranging from the worldwide Internet, private corporate intranets, and small LANs to specialized private networks. All that is required is the use of routers, switches, or any other device capable of performing multicast routing. The allocation of a secondary multicast address with corresponding secondary RP to replace the primary RP in the event of malfunctions reduces the recovery time and improves the reliability of packet delivery.

Figure 5:
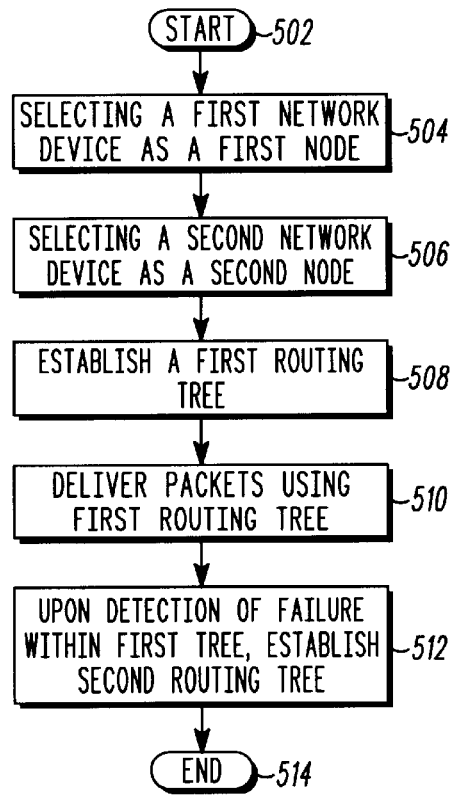
FIG. 5 is a flow chart diagram of a packet routing method for use in a communication system according to one embodiment of the present invention.

Turning now to FIG. 5, there is shown a flow chart depicting a packet routing method for use in a communication system according to another embodiment of the present invention. In this method a routing tree is built for the routing of packets between a plurality of communication devices that are interconnected by one or more network devices within the communication system. Upon detection of the failure or unavailability of the routing tree, another routing tree is established. Commencing at step 502, the method begins with the selection of a first network device as a first node for use in the packet routing method at step 504. At step 506 a second network device is selected as a second node for use in the packet routing method. The selection of the first and second nodes can be made using a number of different criteria such as, for example, the location of target devices for the packet routing, the location of a source device for the packet routing, the availability of resources at various communication devices or network devices, or the geographical distribution of the target devices for the packet routing. Alternatively, if the communication devices in the communication system are distributed among communication zones, the selection can be made based on the probability of service loss in one or more of the communication zones or the availability of resources within one or more communication zone.

After step 506, a first routing tree is built using the first node as a core. If the communication system is an IP network, the first routing tree can be constructed using well known protocols such as PIM-SM and CBT. Of course, it will be appreciated that this method may be employed in communication systems that are not IP networks. In such a case, the routing tree will be built by another appropriate method. At step 510, the first routing tree is used to deliver packets to a plurality of communication devices. This continues unless a failure or unavailability of the first routing tree is detected. At step 512, upon detection of the failure or unavailability within the first routing tree, a second routing tree is established. The second routing tree is then used to deliver packets to the plurality of communication devices.

Figure 6:
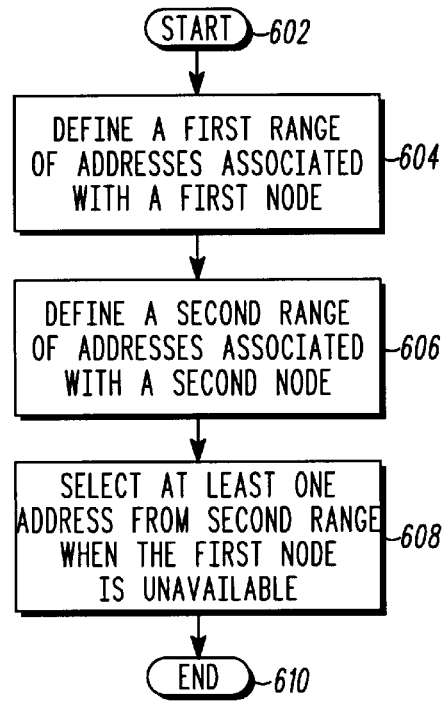
FIG. 6 is a flow chart diagram of a method for selecting an address in a communication system having a plurality of nodes.

FIG. 6 is a flow chart showing a method for selecting an address in a system having a plurality of nodes according to one embodiment of the present invention. Commencing at step 602, the method begins at step 604 where a first range of addresses associated with a first node is defined. At step 606 a second range of addresses associated with a second node is defined. Next, at step 608 at least one address is selected from the second range of addresses when the first node becomes unavailable.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A packet distribution method comprising the steps of:
   defining a first range of group addresses associated with a first node;
   defining a second range of group addresses associated with a second node;
   receiving a packet distribution request from a source device;
   selecting the first node as a primary node based, at least in part, on a geographical density of target devices; and
   selecting from the second range of group addresses, at least one address to be used for distributing packets to and from the source device when the first node is unavailable.

2. The method of claim 1 wherein the step of selecting the first node further comprises the steps of:
   determining a location for one or more target devices; and
   selecting the first node as a function of target device location.

3. The method of claim 1 wherein the step of selecting the first node further comprises the steps of:
   determining a location for the source device; and
   selecting the first node as a function of the source device location.

4. A packet communication system comprising:
   a source device that originates a call;
   at least one target device that receives the call;
   a primary rendezvous point from which a first multicast routing tree is established;
   a secondary rendezvous point from which a second multicast routing tree is established responsive to a primary rendezvous point failure; and
   a plurality of zones, each zone containing a controller, with the primary rendezvous point and the secondary rendezvous point being located in a first zone.

5. The packet communication system of claim 4 further comprising:
   a controller that assigns a primary multicast address and a secondary multicast address in response to the call, the primary multicast address being associated with the primary rendezvous point and the secondary multicast address being associated with the secondary rendezvous point.

6. A packet communication system comprising:
   a source device that originates a call;
   at least one target device that receives the call;
   a primary rendezvous point from which a first multicast routing tree is established;
   a secondary rendezvous point from which a second multicast routing tree is established responsive to a primary rendezvous point failure; and
   a plurality of zones, each zone containing a controller, with the primary rendezvous point located in a first zone, and the secondary rendezvous point located in a second zone.

7. In a communication system having a plurality of communication devices the communication devices being interconnected by one or more network devices, a packet routing method comprising the steps of:
   selecting a first network device as a first node based, at least in part, on a geographical density of target communication devices;
   selecting a second network device as a second node;
   establishing a first routing tree having the first node as a core of the first routing tree;
   delivering packets to a plurality of communication devices using the first routing tree; and
   upon detection of a failure within the first routing tree, establishing a second routing tree having the second node as a core of the second routing tree.

8. The method of claim 7 wherein the step of selecting the first node further comprises the steps of:
   determining a location for one or more target communication devices; and
   selecting the first node as a function of target communication device location.

9. The method of claim 7 wherein the step of selecting the first node further comprises the steps of:
   determining a location for a source communication device; and
   selecting the first node as a function of the source communication device location.

10. The method of claim 7 wherein the step of establishing the first routing tree further comprises using a multicast IP protocol.

11. The method of claim 7 wherein the step of establishing the first routing tree further comprises using a sparse mode multicast IP protocol.

12. In a communication system having a plurality of communication devices the communication devices being interconnected by one or more network devices, a packet routing method comprising the steps of:
   selecting a first network device as a first node based, at least in part, on a probability of service loss at one or more communication zones;
   selecting a second network device as a second node;
   establishing a first routing tree having the first node as a core of the first routing tree;
   delivering packets to a plurality of communication devices using the first routing tree, wherein the plurality of communication devices are distributed among one or more communication zones; and
   upon detection of a failure within the first routing tree, establishing a second routing tree having the second node as a core of the second routing tree.

13. In a communication system having a plurality of communication devices the communication devices being interconnected by one or more network devices, a packet routing method comprising the steps of:
   selecting a first network device as a first node based, at least in part, on identification of a communication zone exhibiting available resources;
   selecting a second network device as a second node;
   establishing a first routing tree having the first node as a core of the first routing tree;
   delivering packets to a plurality of communication devices using the first routing tree, wherein the plurality of communication devices are distributed among one or more communication zones; and
   upon detection of a failure within the first routing tree, establishing a second routing tree having the second node as a core of the second routing tree.

* * * * *